United States Patent [19]
Akagi et al.

[11] Patent Number: 5,495,463
[45] Date of Patent: Feb. 27, 1996

[54] CONTROLLER AND CONTROL METHOD OF LASER POWER FOR RECORDING INFORMATION IN AN OPTICAL RECORD MEDIUM

[75] Inventors: Toshiya Akagi, Neyagawa; Yasuhiro Tai, Kadoma, both of Japan

[73] Assignee: Matsushita Electric Industrial Co., Ltd., Osaka, Japan

[21] Appl. No.: 166,878

[22] Filed: Dec. 15, 1993

[30] Foreign Application Priority Data

Dec. 16, 1992 [JP] Japan .................................. 4-335724
Dec. 7, 1993 [JP] Japan .................................. 5-306425

[51] Int. Cl.⁶ ......................................................... G11B 7/00
[52] U.S. Cl. .......................... 369/116; 369/100; 369/111
[58] Field of Search ................................ 369/116, 100, 369/124, 125, 111, 54, 56, 57

[56] References Cited

U.S. PATENT DOCUMENTS

| | | | |
|---|---|---|---|
| 5,067,117 | 11/1991 | Shimizu et al. | 369/116 |
| 5,274,621 | 12/1993 | Akatsuka | 369/116 |
| 5,321,679 | 6/1994 | Horiguchi | 369/116 |
| 5,359,589 | 10/1994 | Mashimo | 369/116 |

*Primary Examiner*—Tan T. Nguyen
*Attorney, Agent, or Firm*—Willian Brinks Hofer Gilson & Lione

[57] ABSTRACT

In a laser power controller, a part of laser beam emitted from a laser diode 1 is detected with a photodetector 2. The operational processor 3 controls a driver 5 so that the light-emitting power of the laser diode 1 has prescribed values, and the driver 5 drives the laser diode 1. The record powers are set beforehand in one or more gap sections existing between record areas, and the operational processor 3 stores the results of the operation in an external memory 4. On recording, the results stored in the external memory 4 are read by the operational processor 3 so as to set the record powers. Thus, the record powers can be set stably even for a fast recording rate.

16 Claims, 10 Drawing Sheets

CONTROLLER AND CONTROL METHOD OF LASER POWER FOR RECORDING INFORMATION IN AN OPTICAL RECORD MEDIUM

BACKGROUND OF THE INVENTION

1. Field of the Invention

The present invention relates to a laser power controller for an apparatus for recording and reproducing information on an optical record medium such as an optical disk, an optical card or the like with a laser such as a laser diode. The present invention also relates to a control method of laser power.

2. Description of the Prior Art

In general, data are recorded and reproduced on an optical record medium such as an optical disk in the unit of area called as sector defined along a record track. A sector consists of three portions, an identification (ID) section, a gap section provided for controlling the laser power and a record area for recording information, and the three are arranged successively, as shown at the top of FIG. 3. Data are recorded only in record areas. The laser power has to be controlled optimally for recording and for reproduction, respectively.

On recording, the optical intensity of the laser beam on an optical disk has to be adjusted to have prescribed values in order to prevent errors. Because the optical intensity may change reflection property of an optical record medium erroneously, power control is carried out except the record areas, usually at a gap section located just before a record area. In an optical record medium, a gap section is arranged before a record area along the record track. Before recording, the laser beam irradiating the gap sections is monitored to determine appropriate drive conditions of the laser. Then, on recording, the laser is driven in the determined conditions to irradiate record areas according to record signals to change the reflection property at dot sites in the record areas, while on reproduction, the laser beam irradiates record areas to read information according to the light reflected from the record areas.

It is necessary to maintain the intensity of laser beam on the record medium at prescribed values on recording. If a laser diode is used as the laser, the characteristic of drive current against light-emitting power changes largely with ambient temperature and secular change of laser diode. FIGS. 1(a) and 1(b) show examples of the drive current vs. light-emitting power characteristic of a laser diode, wherein threshold value $I_{th}$ denotes a current at which the laser diode starts to emit light. As shown in FIG. 1(a), the threshold value $I_{th}$ increases and the slope coefficient η or a slope of a curve of the drive current vs. light-emitting power characteristic decreases with increasing temperature. On the other hand, as shown in FIG. 1(b), the threshold value $I_{th}$ increases and the slope coefficient η decreases as the laser diode operates for a long time. Therefore, it is needed to control a laser diode so as to keep the drive current at prescribed values under various conditions. Therefore, in an apparatus for recording and reproducing information optically, the laser is controlled so as to keep the optical intensity of laser beam on an optical record medium at prescribed values.

FIG. 2 shows an example of a block diagram of a prior art laser power controller, as disclosed in U.S. Pat. No. 4,845,720, filed Oct. 18, 1988, and issued to Koshi et al. A part of laser beam emitted from a laser diode 101 is detected with a photodetector 102 provided for monitoring. The photodetector 102 converts the light intensity of the incident laser beam to an electric signal, and an operational processor 103 determines the drive current of the laser diode 101 with reference to the output signal of the photodetector 102 so that the light-emitting intensity of the laser diode 101 keeps prescribed values. The operational processor 103 sets the result in a sample-and-hold circuit 114 and a driver 105 drives the laser diode 101 according to the output signal of the sample-and-hold circuit 114. A drive controller 110 sends signals 115, 116 for setting bottom and peak powers and a change signal 108 for changing between recording and reproduction, to the operational processor 103. These signals are used to change laser powers for recording. Further, the driver 105 drives the laser diode 101 according to the output signal received from the operational processor 103 and modulates the laser beam according to record signals 109 received from the drive controller 110. Thus, the record data are recorded correctly in an optical record medium.

FIG. 3 shows an example of the setting of record powers. The laser power control is performed in a gap section located just before a record area to be recorded, in order to determine two record powers, peak and bottom powers. A signal 115 for setting bottom power changes from "L" to "H" level to start the bottom power setting when the laser beam of the laser diode 101 enters a gap section, and the bottom power is determined in a period designated as BP. Next, when a signal 116 for setting peak power changes from "L" to "H" level, the determined value of bottom power is held in the sample-and-hold circuit 114 in a period designated as BS, and the setting of the peak power is started. Then, the peak power is determined in a period designated as PP. When the laser beam enters from the gap section to the record area, the change signal 108 changes from "L" to "H" level, and the setting value of the peak power is held in the sample-and-hold circuit 114 in a period designated as PS. After the two laser powers are held in the sample-and-hold circuit 114, the driver 105 performs recording according to record signals 109 received from the drive controller 110 by modulating the laser beam between the bottom and peak powers. When the laser beam passes the record area, the change signal 108 and the signals 115 and 116 are changed from "H" to "L" level at the same time, the sample-and-hold circuit 114 stops holding the signal, and the control of the record power is started again.

Usually, it takes about six to ten μsec for the laser beam to pass a gap section. Therefore, the bandwidth of laser diode power control has a gain cross point at a few hundred kHz or higher in order to complete the setting of the bottom and peak powers in a gap section. Then, the gain cross point is set at a few hundred kHz to hasten the response of the setting of record powers. In this case, the bandwidth of read power is also extended in the same way, but there is no problem on the control of read power. In a gap section, the laser power is changed from the read power to the bottom power. The above-mentioned determination of the bottom power completes in three to four μsec because the frequency band is widened by extending to higher frequencies. After completing the setting of the bottom power, it is sampled and held. Next, the peak power is set. The determination of peak power also completes in three to four μsec, and the bottom power is sampled and held. After the determination of the record powers, the laser beam enters a record area, and the recording is carried out by modulating the laser beam between the determined bottom and peak powers.

As shown in FIGS. 1(a) and 1(b), the gain of the control loop changes according to the ambient temperature and the operating time. This changes the cross point of gain, so that the phase characteristic is also affected around the cross point. Then, the phase compensation is performed to give a margin for such a gain change in order to change the read power to the record power stably in a gap section. However, prior art laser power controllers have problems if the recording is carried out at a faster rate and at a higher density. If a time wherein the beam passes a gap section is shortened to for example a third of a time needed in prior art controllers, the bandwidth for the power control has to be widened to be extended to higher frequencies by three times, and the gain cross point of the control loop has to be increased to for example about one MHz. Then, it is needed to compensate the phase to have a margin even if the gain changes according to the temperature or the secular change of the laser diode. However, because the photodetector has a cut-off frequency at five to ten MHz, this cannot be neglected for the frequency characteristic having a gain cross point of about one MHz. Further, because the gain is changed to correct the scattering of slope efficiency and the like, the change of frequency characteristic due to the gain change has to be taken into account. If these factors are considered to increase processing rate, the circuit of the laser power controller becomes complicated. That is, the circuit scale becomes larger, more adjustment points have to be provided in the circuit, and the components used for the laser diode and for the photodetector have to be selected to satisfy prescribed specifications. Thus, the number of the components of the controller increases, and the cost thereof will increase.

If the cut-off frequency of the photodetector can be increased to about twenty MHz, the effect of the photodetector on the control characteristic can be neglected. However, this needs a photodetector and components of better quality, and this increases the cost thereof.

SUMMARY OF THE INVENTION

An object of the present invention is to provide a laser power controller which can set powers of laser beam stably at prescribed values for a high rate of recording and reproduction.

Another object of the present invention is to provide a laser power control method which can set powers of laser beam stably at prescribed values for a high rate of recording and reproduction.

In one aspect of the present invention, a laser power controller is provided for an apparatus of recording information with a laser such as a laser diode in an optical record medium such as an optical disk. On an optical record medium, a record track consists of record areas and gap sections not used to record information, and each gap section is arranged before one of the record areas. In the controller, a photodetector detects an optical intensity of a part of the beam emitted by a laser such as a laser diode for monitoring the power and converts the optical intensity to an electrical signal. An operational processor determines a power such as a drive current to drive the laser to emit a beam according to the electrical signal received from the photodetector so that the optical intensity detected by the photodetector agrees with a prescribed value when the laser is driven with the determined power. A memory means stores the output signal sent from the operational processor. A driver drives the laser according to the result of the operation of the power stored in the memory. A controller sends a timing signal to the operational processor if the beam enters a gap section.

When the timing signal is received from the controller, the operational processor determines a power to drive the laser according to a difference of the output electrical signal of the photodetector from a prescribed value. Then, it sends the power data to the memory means. On recording, the stored power data is read for driving the laser to emit laser power at a prescribed value.

Preferably, in the operational processor, an analog-to-digital converter converts the output signal of the photodetector to a digital output data. A digital signal processor determines the power of the laser by comparing the prescribed value with the digital output data of the analog-to-digital converter and sends the determined output data to the memory means as a digital memory means. The output signal of the digital signal processor produces a digital value converted from the analog value which agrees with the prescribed value of power. A digital-to-analog converter converts the output signal of the digital signal processor to an analog output data.

The power to be determined includes a first power and a second power smaller than the first power, and they can be determined in different gap sections. For example, the controller sends timing signals to the operational processor when the laser beam enters gap sections located before a record area to be recorded. Preferably, the first and second powers are determined in a gap section located just before a record area preceding the record area to be recorded and in another gap section located just before the record area to be recorded.

When the recording is performed over a plurality of record areas, preferably, the laser powers for recording are determined initially in gap sections located before a first record section in the successive or plural record areas and after the recording is started, the powers for a record area after the first one are determined by using gap sections located between record areas of the successive or plural record areas.

If the laser power cannot be determined by using only one gap section, an intermediate result of the determination of the operational processor at the end of the gap section is preferably stored in the memory. Then, the determination is started again at a later gap section by using the stored intermediate result stored in the memory.

Preferably, the determination of the laser power is repeated over a plurality of gap sections, and the laser power for the laser is determined suitably by using the plurality of determined data. For example, an average, a maximum or a minimum of the determined data is used to set a record power.

An advantage of the present invention is that the record power for laser beam can be set before a record area to be recorded by using a external memory.

Another advantage of the present invention is that a plurality of powers can be determined in different gap sections.

A still another advantage of the present invention is that when the power cannot be determined in a gap section, the determination can be started again from an intermediate value in the determination stored in the external memory.

A further advantage of the present invention is that the powers for laser beam can be set stably at a fast rate of recording, without increasing the scale of the circuit.

A still further advantage of the present invention is that the record powers for laser beam can be set stably at a fast rate of recording, without increasing the number of components in the circuit.

BRIEF DESCRIPTION OF THE DRAWINGS

These and other objects and features of the present invention will become clear from the following description taken in conjunction with the preferred embodiments thereof with reference to the accompanying drawings, and in which.

DETAILED DESCRIPTION OF THE PREFERRED EMBODIMENTS

Figure 4:
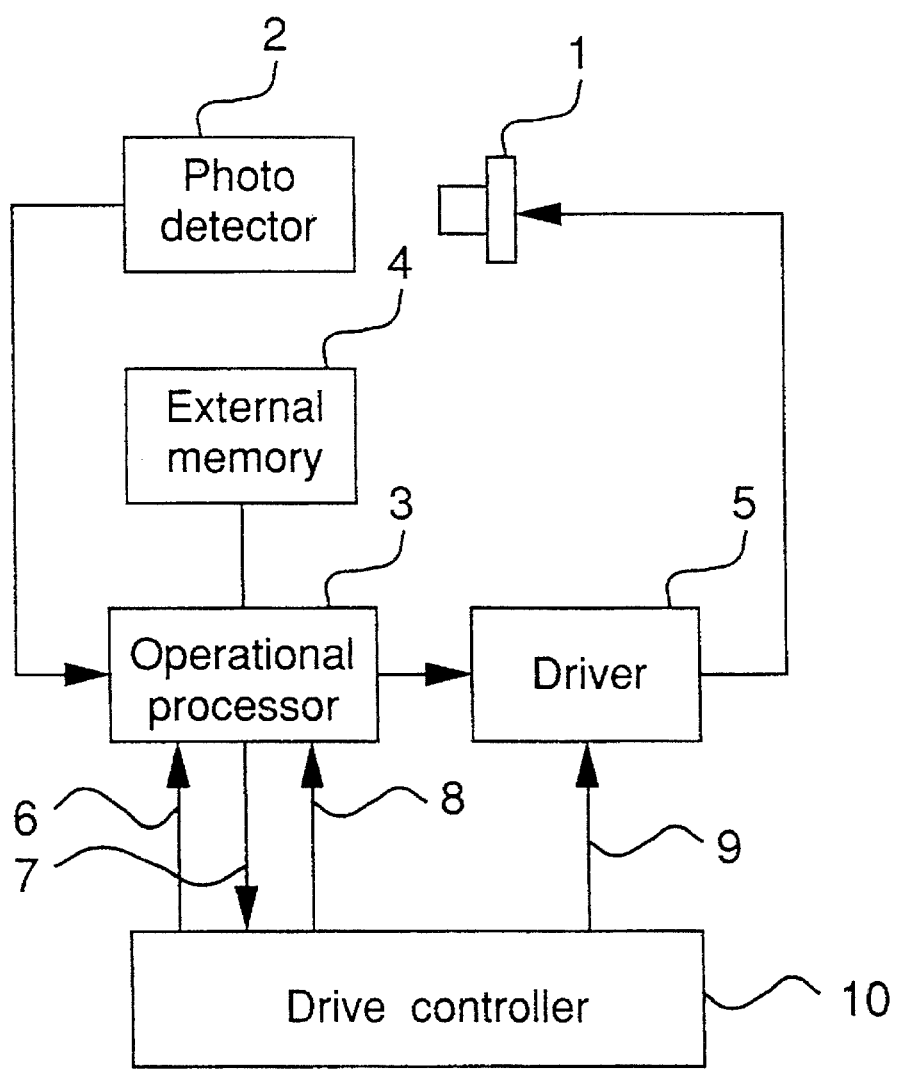
FIG. 4 is a block diagram of a laser power controller for laser diode of a first embodiment of the present invention.

Referring now to the drawings, wherein like reference characters designate like or corresponding parts throughout the several views, FIG. 4 shows a block diagram of an apparatus of recording and reproducing data on an overwrite type optical disk of a first embodiment of the present invention. A part of laser beam emitted from a laser diode 1 is detected with a photodetector 2 made from a p-i-n photodiode and provided for monitoring laser power. The photodetector 2 is for example a detector provided in a laser diode at the rear side opposite to the front side for emitting a beam onto an optical disk and detects a part of light radiated by the laser diode 1. The photodetector 2 converts the light intensity of the incident light to an electric signal and sends it to an operational processor 3 such as a central processing unit or a digital signal processor. The operational processor 3 processes an operation to determine the drive current of the laser diode 1 so as to maintain the light-emitting power of the laser diode 1 at a prescribed value with reference to a difference of the output signal of the photodetector 2 from the prescribed value. The operational processor 3 stores the result in an external memory 4 and sends it to the driver 5. A drive controller 10 sends a signal 6 for setting record power and a change signal 8 for changing between recording and reproduction to the operational processor 3, while the latter sends a signal 7 of completion of laser power setting to the former. The external memory 4 comprises a digital memory in this embodiment, but it may comprise an analog memory. These signals are used to change laser power for recording and reproduction and to store the result to the external memory 4. The driver 5 drives the laser diode 1 according to the output signal received from the operational processor 3 and modulates the laser power according to record signals 9 received from the drive controller 10. Thus, the information is recorded or reproduced on an optical record medium such as an optical disk.

Figure 5:
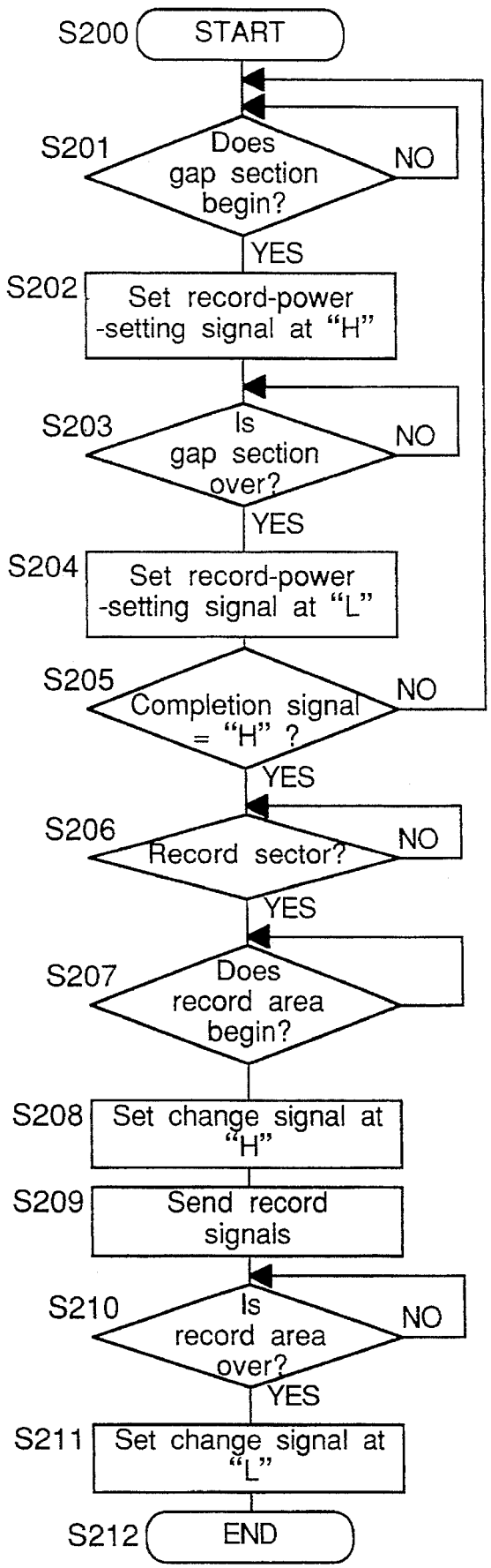
FIG. 5 is a flowchart of an example of recording of a drive controller of the laser power controller.
Figure 6A:
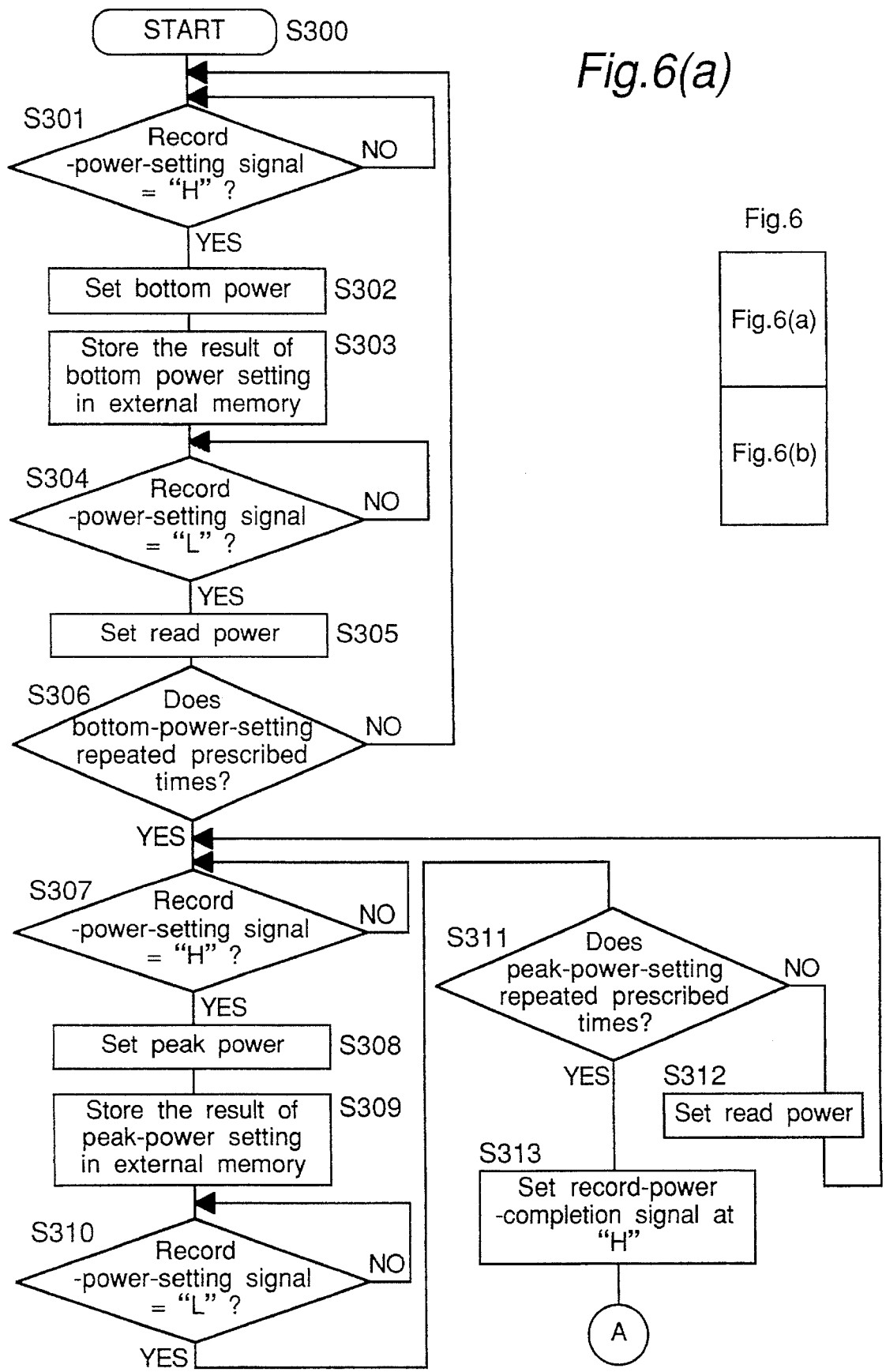
FIGS. 6(a) and 6(b) are flowcharts of a processor for setting record powers.
Figure 6B:
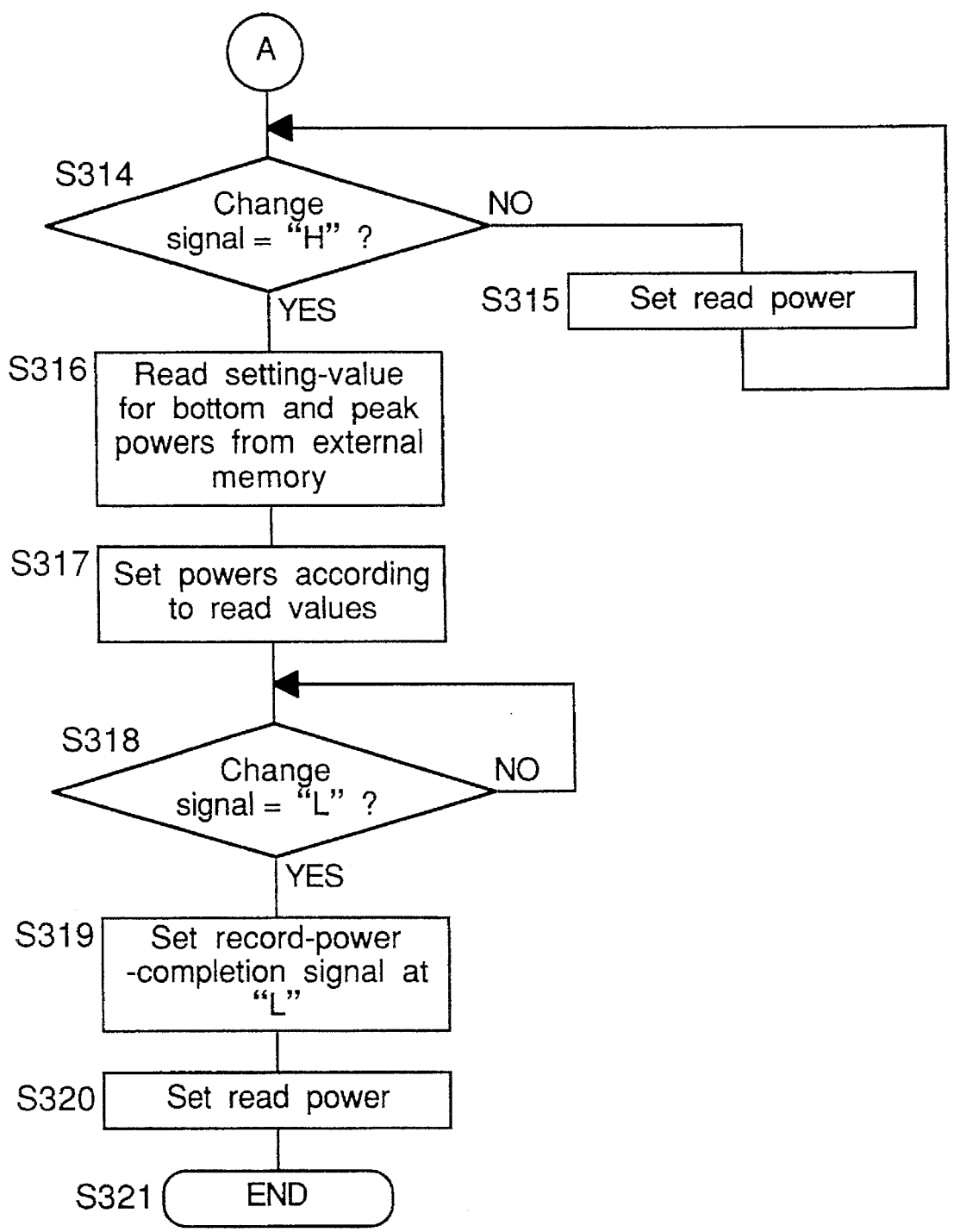

FIG. 5 shows a flowchart of an example of recording of the drive controller 10, while FIGS. 6(a) and 6(b) shows a flowchart of the operational processor 3 for setting the laser powers. The drive controller 10 controls the entire operation of the apparatus. For example, it controls the tracking of a head with the laser diode 1 on an optical disk. However, the drive controller 10 is explained here only with respect to the laser power control.

Figure 7:
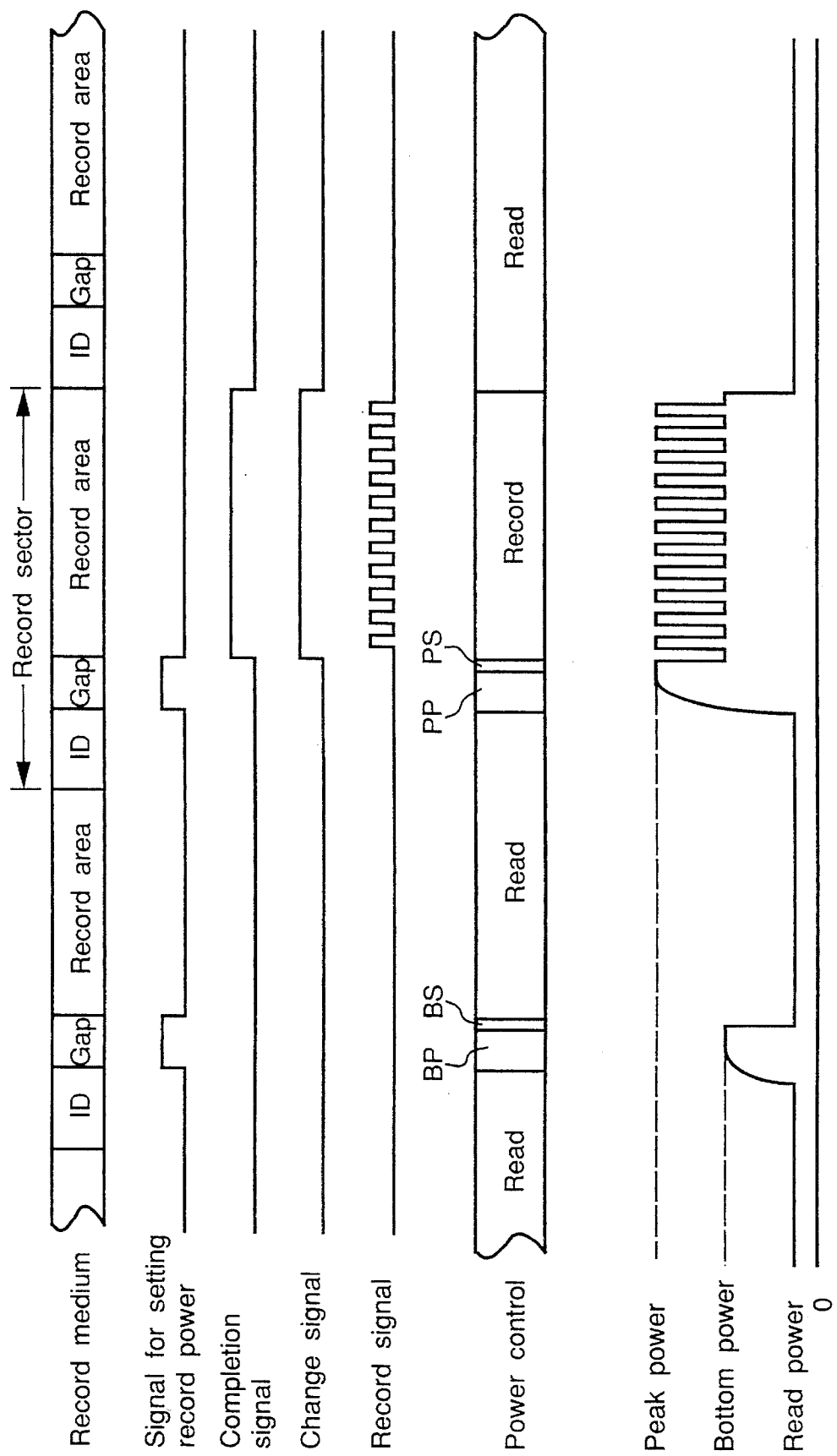
FIG. 7 is a diagram of waveforms on setting the record powers.

FIG. 7 shows a diagram of waveforms on determining the drive current of the laser diode 1. In general, recording and reproduction is carried out on an optical disk in the unit of an information record unit called as sector. A sector consists of three segments, an identification (ID) part, a gap section provided for controlling the laser power and a record area for recording information, and the three segments are arranged successively, as shown at the top of FIG. 7. The reproduction relates to all the segments in a sector, while the recording deals with only the record area. The laser powers are set optimally for reproduction and for recording, respectively. The recording is performed according to record signals between two record powers, that is, peak power and bottom power smaller than the peak power. On the other hand, the reproduction is performed at a read power much lower than the bottom power.

The operational processor 3 determines laser powers with reference to prescribed reference light-emitting powers, that is, peak power, bottom power and read power. At the bottom in FIG. 7, the prescribed reference laser powers are shown with dashed lines. For example, when peak power is determined, the operational processor 3 sets an initial value of the drive current for the driver 5, and receives the output signal of the photodetector 2 in correspondence to the initial value. Then, the output signal of the photodetector 2 is compared with a prescribed peak signal value. If the output signal is larger than the prescribed signal value, the light-emitting power has to be decreased. Then, the operational processor 3 sets a new, smaller value of the drive current to decrease the light-emitting power. For example, the difference between the reference value and the detected value, that is, the error of the comparison is amplified with a loop gain of the peak power wherein the loop gain is increased by an amplification factor determined by taking into account the diode laser 1, the photodetector 2 and the driver 5. Then, the operational processor 3 sends the amplified error to the driver 5 to control the drive current of the laser diode 1. This process is repeated until the laser power agrees with the prescribed power value.

An example of power control sequence is shown at the middle of FIG. 7. A record area included in a record sector designated at the top of FIG. 7 is a record area wherein record data are to be recorded. The bottom power is determined in a period designated as BP and a result of the operation of bottom power is stored in the external memory 4 in a period designated as BS following the period BP, in a gap section in a record sector before the record sector to be recorded. Further, the peak power is determined in a period designated as PP and a result of the operation of peak power is stored in the external memory 4 in a period designated as PS following the period PP, in a gap section located just before the record area to be recorded. In the two gap sections, the drive controller sets a signal 6 to be "H" level for setting the record power. Then, in the record area to be recorded, the results of the operations of the peak and bottom powers are read from the external memory 4 and sent to the driver 5, and the recording is performed by using the two record powers determined previously in gap sections before the record area. In the record area, the operational processor 3 sets a signal 7 to be "H" level for designating the completion of the setting of the record signals, while the drive controller 10 sets a signal 8 to be "H" level for designating the change from reproduction to recording. On the other hand, the reproduction can be performed in other areas except the above-mentioned periods.

The gain cross point of the laser diode power control is set at a few hundred kHz irrespective of record and reproduction, so that the response of the record power setting in the gap sections is made faster.

Because a read power does not cause an optical change to an optical record medium, the read power can be controlled at any sector on an optical record medium. The band width of the power control characteristic of the laser diode 1 is set as a few hundred kHz for the response on setting record power, and the read power is also controlled with the same bandwidth. Thus, the power control can follow the change of the characteristic of the laser diode 1 according to temperature or the like sufficiently.

FIG. 5 shows a flowchart of an example of recording of the drive controller 10. When recording is started, first, it is checked if the laser beam of the laser diode 1 enters a gap section in a sector on an optical disk (step S201). If a start point of a gap section is detected (YES at step S201), the signal 6 for setting record powers is set as "H" level (step S202). Next, if an end point of the gap section is detected (YES at step S203), the signal 6 for setting record powers is set as "L" level (step S204). The operational processor 3 performs the record power setting while the signal 6 is set as "H" level. If the record power setting is completed, the processor 3 sets the completion signal 7 at "H" level for indicating the completion of laser power setting. The completion signal 7 of "L" level means that the record power setting is not completed in a gap section. Therefore, it is checked next if the completion signal 7 for indicating the completion of laser power setting is "H" level or not (step S205), and the detection of a gap section and the setting of the signal 6 are repeated until the completion signal 7 becomes "H" level.

If it is decided that the completion signal 7 for indicating the completion of laser power setting becomes "H" at step S205, it is checked next if a record area exists or not (step S206). If not, the step is repeated until a record area is confirmed to exist. If a record area is confirmed to exist (YES at step S206), it is next detected if the laser beam enters a record area or not (step S207). If the start of the record area is confirmed to exist (YES at step S207), the change signal 8 between recording and reproduction is set as "H" level and is sent to the operational processor 3 (step S208), and record signals 9 are sent to the driver 5 (step S209). Next, if the end of record area is detected (YES at step S210), the change signal 8 is set as "L" level (step S211). Thus, the record power setting of the drive controller 10 is completed.

FIGS. 6(a) and 6(b) show a flowchart of the operational processor 3 for setting record powers. First, it is waited until the signal 6 for setting record power received from the drive controller 10 becomes "H" level (YES at step S301). Then, the bottom power is set (step S302). In the bottom power setting, the operational processor 3 detects an error of the output signal of the photodetector 2, obtained according to the output power of the laser diode 1, from a prescribed peak value set for the bottom power, and the error is amplified with a loop gain of the bottom power wherein the loop gain is increased by an amplification factor determined by taking into account the diode laser 1, the photodetector 2 and the driver 5. Then, the operational processor 3 sends the amplified error to the driver 5 to control the power of the laser diode 1. Then, the result of the operation of the bottom power setting is stored in the external memory 4 (step S303). It takes three to four μsec for the laser beam to pass a gap section wherein the signal 6 for setting the record power is set as "H" level. In such a case, conventional components can be used for the photodetector 2, the operational processor 3 and the driver 5, and even if the gain cross point of the power control is a few hundred kHz, the bottom power can be determined stably and the result of the operation can be stored. After the laser beam passes the gap section, and if it is confirmed that the signal 6 for setting the record power becomes "L" level (YES at step S304), the read power is set (step S305). The bottom power can be set only once. However, in the example shown in FIG. 6(a), the setting of the bottom power is repeated by returning to step S301.

If the setting of the bottom power is repeated prescribed times (YES at step S306), it is waited next until the signal 6 for setting the record power becomes "H" level (step S307). Then, the peak power is set (step S308). In the peak power setting, the operational processor 3 detects an error of the output signal of the photodetector 2, obtained according to the output power of the laser diode 1, from a prescribed signal value set for the peak power, and the error is amplified with a loop gain of the peak power wherein the loop gain is increased by an amplification factor determined by taking into account the diode laser 1, the photodetector 2 and the driver 5. Then, the operational processor 3 sends the amplified error to the driver 5 to control the power of the laser diode 1. Then, the result of the operation of the peak power setting is stored in the external memory 4 (step S309). It takes three to four μsec for the laser beam to pass a gap section wherein the signal 6 for setting the record power is set as "H" level. The peak power can be determined stably and the result of the operation can be stored for the three to four μsec. After the laser beam passes the gap section, it is waited until the signal 6 for setting the record power becomes "L" level (YES at step S310). The peak power can also be set only once. However, in the example shown in FIG. 6(a), the setting of the peak power is repeated. That is, the read power is set first (step S312), and the flow returns to step S307. If the determination of the peak power is repeated prescribed times (YES at step S311), the completion signal 7 of the completion of record power setting is set at "H" level, and it is sent to the drive controller 10 to inform the completion of the setting of the record power or of the preparation of recording (step S313). Then, the drive controller 10 sets the change signal 8 at "H" level if a sector under question is a record sector.

Next, it is checked if the change signal 8 is "H" level or not (step S314). If the change signal 8 is decided not to be set at "H" level, the read power is set (step S315), and the flow returns to step S314. If the change signal 8 is decided to be set at "H" level (YES at step S314), the results of the operation of the bottom and peak powers are read from the external memory 4 (step S316), and the bottom and peak values are set according to the read values (step S317). The setting of the bottom and peak values are maintained as far as the change signal 8 is kept at "H" level (NO at step S318), and the driver 5 modulates the drive current of the laser diode between the bottom and peak values according to record signals 9. If it is checked that the change signal 8 becomes "L" level (YES at step S318), the record-power-completion signal 7 is set at "L" level (step S319), and the read power is set (step S320). Then, the flow of the setting of record powers is completed.

FIG. 7 shows a diagram of an example of waveforms of various signals on setting the record powers explained above. In this example, the bottom power is determined in a gap section in a sector before the record sector under consideration, while the peak power is determined in a gap section in the record sector. Each setting of the two record powers is completed in a gap section, respectively. At the bottom of FIG. 7, it is shown that the power determined by the operational processor 3 is changed continuously, and the light-emitting power increases and converges to the prescribed bottom power in the gap section for determining to the bottom power. Similarly, the light-emitting power increases and converges to the prescribed peak power in the gap section for determining the peak power. In each gap section, the operational processor 3 determines the bottom or peak power until the optical intensity detected by the photodetector 2 agrees with a prescribed value when the laser diode 2 is driven with the determined power. Because the bottom and peak powers are determined in two gap section, the power setting can be performed stably without affecting the ID sections and the record areas due to the change of laser power.

In the example shown in FIG. 7, the bottom power is determined in a gap section located just before the record area before the record sector under consideration. However, the bottom power can also be determined in a gap section located before the record sector under consideration, for example in a gap section by five gap sections before the record section under consideration.

In the example shown in FIG. 7, the peak power is set in a gap section located just before the record area under consideration. However, the peak power can also be set in a gap section located before the record area under consideration, for example in a gap section by three gap sections before the record section under consideration if the bottom power is set in a gap section by five gap sections before the record section under consideration.

Further, in this example, the final results of the operation of the operational processor 3 to be sent to the driver 5 are stored in the external memory 4. However, if the final results to be sent to the driver 5 can be derived by the operational processor 3 from intermediate results, the intermediate results of the operation can be stored in the external memory 4. In the setting of laser powers, the intermediates results are read from the memory to derive the final results, and the recording can be performed by using the final results.

Figure 8:
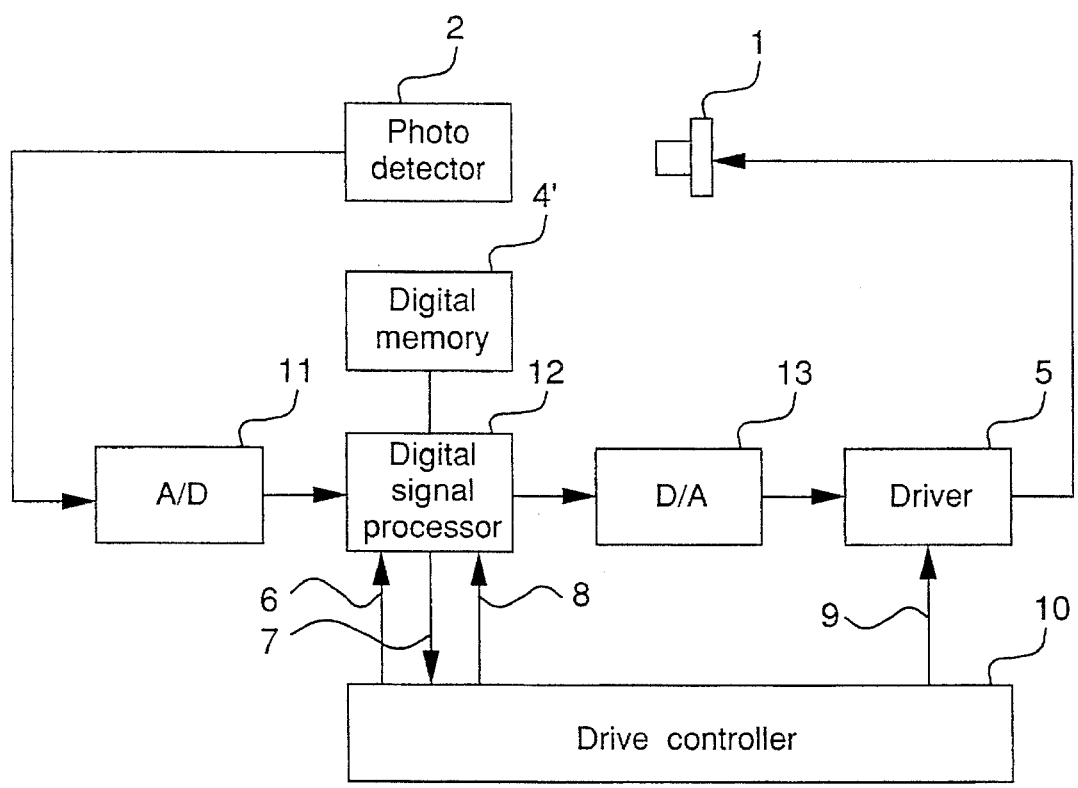
FIG. 8 is a block diagram of an example of a laser power controller of the second embodiment of the present invention.

Next, another embodiment of the present invention is explained with reference to FIG. 8. A part of laser beam emitted from a laser diode 1 is detected with a photodetector 2. The photodetector 2 converts the light intensity of the incident light to an electric signal and sends it to an analog-to-digital converter 11, which converts the electric signal to a digital signal to be sent to a digital signal processor 12. The digital signal processor 12 processes the digital signal to determine the light-emitting power of the laser diode 1 with reference to the output signal of the analog-to-digital converter 11 so as to maintain laser power at a prescribed value, and it sends the result to a digital-to-analog converter 13. The digital signal processor 12 stores the result in an external memory 4' and sends it to the driver 5. A drive controller 10 sends a signal 6 for setting record power and a change signal 8 for changing between recording and reproduction to the digital signal processor 12, while the latter sends a signal 7 for indicating the completion of laser power setting to the former. These signals are used to change laser power for recording and reproduction and to store the result to the external memory 4'. The driver 5 drives the laser diode 1 according to the output signal received from digital-to-analog converter 13 and modulates the laser power according to record signals 9 received from the drive controller 10. Thus, the information is recorded or reproduced on an optical record medium such as an optical disk.

In case of the processing of digital data, it is easy to change the frequency characteristic of power control. Therefore, optimum characteristics can be provided for the reproduction and for the recording.

Because a read power does not cause an optical change to an optical record medium, the power can be controlled at any area on an optical record medium, and the band width of the power control of laser diode 1 is set so that the power control can follow the change of the characteristic of laser diode 1 according to temperature sufficiently. The digital signal processor 12 is usually set to have a cross point of gain characteristic at a few kHz.

Next, the setting of the record powers of this embodiment is explained. The procedure of the setting is similar to that of the first embodiment shown in FIGS. 5-7. The drive controller 10 performs a procedure similar to that shown in FIG. 5, and the explanation thereof is omitted here. In this embodiment, the flow shown in FIGS. 6(a) and 6(b) is performed by the digital signal processor 12.

The procedure of the digital signal processor 12 is explained next with reference to FIGS. 6(a) and 6(b). First, it is waited until the signal 6 for setting record power received from the drive controller 10 becomes "H" level (YES at step S301). Then, the bottom power is determined (step S302). In the bottom power setting, the operational processor 3 detects an error of the digital value of the analog-to-digital converter 11, obtained according to the output power of the laser diode 1, from a prescribed signal value set for the bottom power, and the error is amplified with a loop gain of the bottom power wherein the loop gain is increased by an amplification factor determined by taking into account the diode laser 1, the photodetector 2, the analog-to-digital converter 11, the digital-to-analog converter 13 and the driver 5. Then, the amplified error is sent to the driver 5 via the digital-to-analog converter 13 to control the power of the laser diode 1. Then, the result of the operation of the bottom power setting is stored in the external digital memory 4' (step S303). It takes three to four μsec for the laser beam to pass a gap section wherein the signal 6 for setting the record power is set as "H" level. In order to set the record power in such a short time, the bandwidth of the power control of the digital signal processor 12 is widened by extending to high frequencies and the gain cross point is set at a few hundred kHz. Because it is easy to change the frequency characteristic for such a digital signal processing, the response of the bottom power setting becomes faster and the power control becomes stable. For such a bandwidth, conventional components can be used for the photodetector 2 and the driver 5, and the bottom power can be determined stably and the result of the operation can be stored. After the laser beam passes the gap section, if it is confirmed that the signal 6 for setting the record power becomes "L" level (YES at step S304), the read power is set and the gain cross point of the power control is changed to a few kHz (step S305). The bottom power can be set only once. However, in the example shown in FIG. 6(a), the setting of the bottom power is repeated by returning to step S301.

If the setting of the bottom power is repeated prescribed times (YES at step S306), it is waited next until the signal 6 for setting the record power becomes "H" level (step S307). Then, the peak power is determined (step S308). In the peak power setting, the digital signal processor 12 detects an error of the digitalized output signal of the photodetector 2, obtained according to the output power of the laser diode 1, from a prescribed digital signal value set for the peak power, and the error is amplified with a loop gain of the peak power wherein the loop gain is increased by an amplification factor determined by taking into account the diode laser 1, the photodetector 2, the analog-to-digital converter 11, the digital-to-analog converter 13 and the driver 5. Then, the digital signal processor 3 sends the amplified error to the driver 5 to control the power of the laser diode 1. Then, the result of the operation of the peak power setting is stored in the external digital memory 4' (step S309). In order to determine the peak power stably and to store the result of the operation for three to four μsec for the laser beam to pass a gap section, the bandwidth of the power control is widened to have a gain cross point at a few hundred kHz by extending to higher frequencies. After the laser beam passes the gap section, it is waited until the signal 6 for setting the record power becomes "L" level (YES at step S310). The setting of the peak power is repeated. That is, the read power is set first (step S312), and the flow returns to step S307.

If the setting of the peak power is repeated prescribed times (YES at step S311), the completion signal 7 of the completion of record power is set at "H" level, and it is sent to the drive controller 10 to inform the completion of the setting of the record power or of the preparation of recording (step S313). Then, the drive controller 10 sets the change signal 8 at "H" level if a sector under consideration is a record sector.

Next, it is checked if the change signal 8 is "H" level or not (step S314). If the change signal 8 is decided not to be set at "H" level, the read power is set (step S315), and the flow returns to step S314. If the change signal 8 is decided to be set at "H" level (YES at step S314), the results of the operation of the bottom and peak powers are read from the external digital memory 4' (step S316), and the bottom and peak values are set according to the read values (step S317). The bottom and peak values are maintained as far as the change signal 8 is kept at "H" level (NO at step S318), and the driver 5 modulates the drive current between the bottom and peak values according to record signals 9. If it is checked that the change signal 8 becomes "L" level (YES at step S318), the record-power-completion signal 7 is set at "L" level (step S319), and the read power is set (step S320). Then, the flow of the setting of record powers is completed.

The waveforms of various signals on setting the record powers are also similar to those shown in FIG. 7 explained above. The bottom power is set in a gap section in a sector before the record sector under consideration, while the peak power is set in a gap section in the record sector. Because the bottom and peak powers are determined in two gap section, the power setting can be performed stably without affecting the ID sections and the record areas due to the variation of laser power.

In the second embodiment explained above, the gain and the phase in the power control are chosen to have margins sufficient with respect to the drive-current vs. light-emitting power characteristic of the diode laser 1. Optimum frequency characteristic of the power control can be provided, by using a feature of digital signal processing, so that stable record powers can be set.

Figure 9:
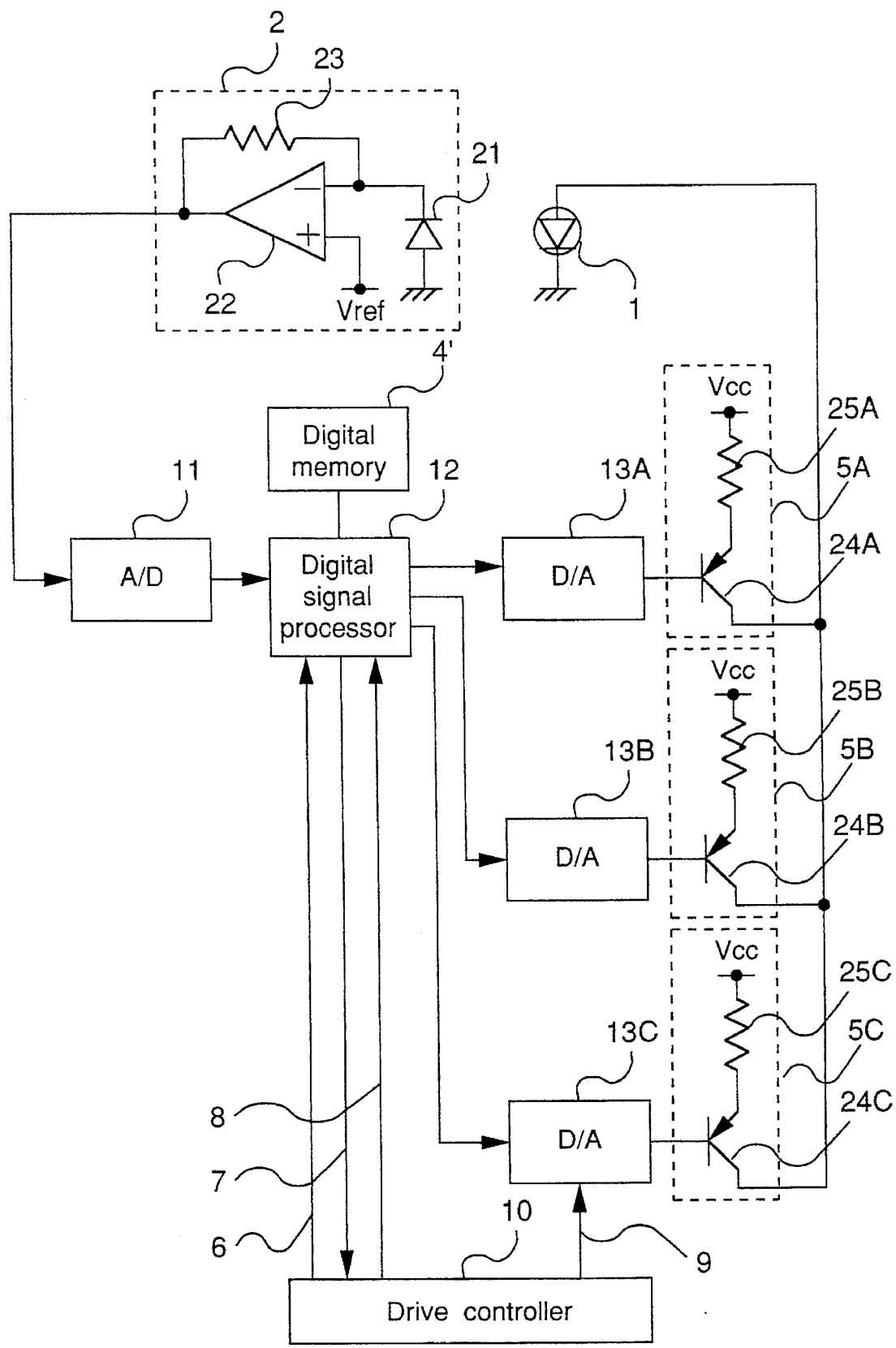
FIG. 9 is a specific circuit diagram of a laser power controller of the second embodiment.

FIG. 9 shows a specific circuit structure of a laser diode power control circuit of the second embodiment. The photodetector 2 consists of a p-i-n photodiode 21, an operational amplifier 22 and a conversion resistor 23. A current flows through the photodiode 21 according to the optical power received from the laser diode 1, and it is converted to a voltage signal. This voltage signal is converted to a digital value by the analog-to-digital converter 11. The digital signal processor 12 detects an error of the digital output value of the analog-to-digital converter 11 from a prescribed digital signal set for the record power, and the error is amplified with a loop gain of the record power wherein the loop gain is increased by an amplification factor determined by taking into account the diode laser 1, the photodetector 2, the analog-to-digital converter 11, digital-to-analog converter 13A, 13B, 13C and driver 5A, 5B, 5C. Digital-to-analog converter 13A, 13B or 13C and drivers 5A, 5B, 5C connected thereto are provided for read power, bottom power and peak power, respectively. The result of the operation of the digital signal processor 12 is sent to the digital-to-analog converter 13A, 13B or 13C. The analog output of the digital-to-analog converter 13A, 13B or 13C is sent to the driver 5A, 5B or 5C. The driver 5A comprises a power transistor 24A and a resistor 25A connecting the transistor 24A to $V_{cc}$. The driver 5B comprises a power transistor 24B and a resistor 25B connecting the transistor 24B to $V_{cc}$. The driver 5C comprises a power transistor 24C and a resistor 25C connecting the transistor 24C to $V_{cc}$. The laser diode 1 is connected between collectors of the three transistors 24A, 24B and 24C commonly and the ground. In the setting of read power, the analog voltage of the digital-to-analog converter 13A is converted to a current signal by the driver 5A to drive the laser diode 1. In the setting of bottom power, the analog voltage of the digital-to-analog converter 13B is converted to a current signal by the driver 5B to drive the laser diode 1, while keeping the output of the digital-to-analog converter 13A constant. In the setting of peak power, the analog voltage of the digital-to-analog converter 13C is converted to a current signal by the driver 5C to drive the laser diode 1, while keeping the outputs of the digital-to-analog converters 13A and 13B constant.

In the above-mentioned example, the bottom power is set in a gap section located just before the record area before the record sector under consideration. However, the bottom power can also be set in a gap section located before the record sector under consideration, for example in a gap section by five gap sections before the record section.

In the above-mentioned example, the peak power is determined in a gap section located just before the record area under consideration. However, the peak power can also be determined in a gap section located before the record area under consideration, for example in a gap section by three gap sections before the record section under consideration if the bottom power is determined in a gap section by five gap sections before the record section.

The bottom power and the peak power may be set only once, respectively. However, in the above-mentioned example, the setting is performed several times. Then, the digital signal processor 12 averages the results to improve the precision of the setting of the powers. The results can also be used efficiently in other ways. For example, if a record material of an optical disk has a characteristic stable even when the record power characteristic of the record medium shifts to higher power, the maximum is adopted from the results, whereas if a record material of an optical disk has a characteristic stable even when the record power characteristic of the record medium shifts to lower power, the minimum is adopted from the results.

Further, in this example, the final results of the operation of the digital signal processor 12 to be sent to the driver 5 are stored in the external digital memory 4'. However, intermediate results of the operation can be stored in the external digital memory 4' if the final results to be sent to the driver 5 can be derived by the digital signal processor 12 from the intermediate results.

In the above-mentioned first and second embodiments, two record powers, that is, the first power (peak power) and the second power (bottom power) in correspondence to record signal 8 of "1" and "0", are used. There are two types of the second power. In overwrite type optical disks wherein new data are recorded while erasing written data, the second power is set to be larger than the first power or to be intermediate between the read power and the record power. On the contrary, in a non-overwrite type and a write-once type optical disks, the second power is set near the read power or near zero because the record film has not to be affected.

In the above-mentioned embodiments, if the amount of information is so large to be recorded in a record area and the information is recorded over a plurality of record areas, after the bottom and peak powers are determined initially before recording, the bottom power and the peak power can be determined repeatedly thereafter by using a plurality of gap sections, to optimize the bottom and peak powers for recording in the record areas. The setting of the peak power is not necessarily performed by the same times as that of the bottom power. In order to determine the peak power which affects the recording state of optical disk largely, it is preferably that the number of the setting of the peak power is larger than that of the setting of the bottom power. For example, a ratio of the number of the setting of the peak power to that of the setting of the bottom power is 2:1 or 3:1. It is also effective that the bottom power is determined only once for each recording. Further, for an optical disk of non-overwrite type wherein the bottom power is not so large to affect recording state, it is possible to set the bottom power during reproduction, not necessarily in a gap section, but also for example in a record area.

Further, if the bottom or peak power cannot be determined in a single gap section because the gap section becomes shorter by increasing the rate of the recording and reproduction, the power setting is not completed in a first gap section. However, if the laser power controller of the embodiments uses digital processing, the result in the first gap section can be stored in the digital memory, and the setting can be started again in a second gap section after reading the stored data. Thus, the power setting can be performed continuously over a plurality of gap sections. The number of the gap sections used for the determination of record power can be increased easily if necessary.

Figure 1A:
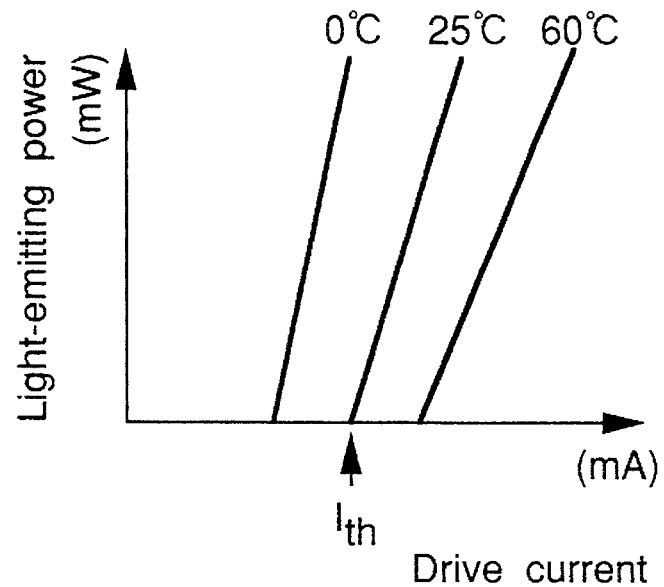
FIGS. 1(a) and 1(b) show an example of the temperature dependence and the operating time dependence of the drive current vs. light-emitting power of a laser diode, respectively.
Figure 1B:
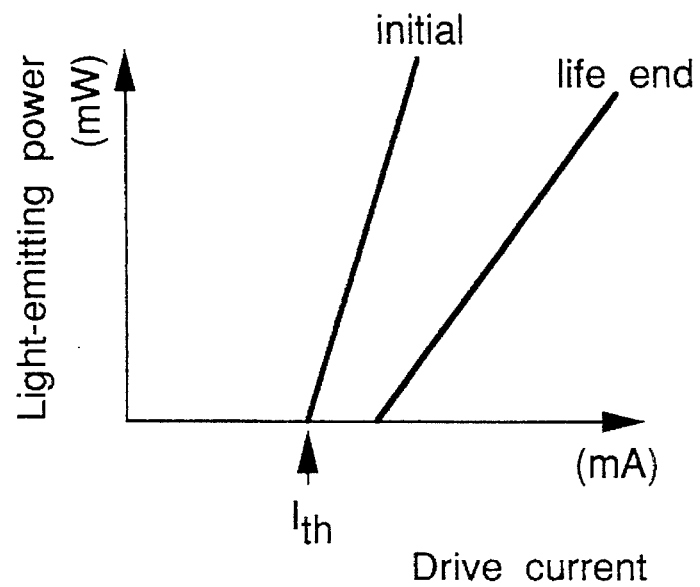
Figure 2:
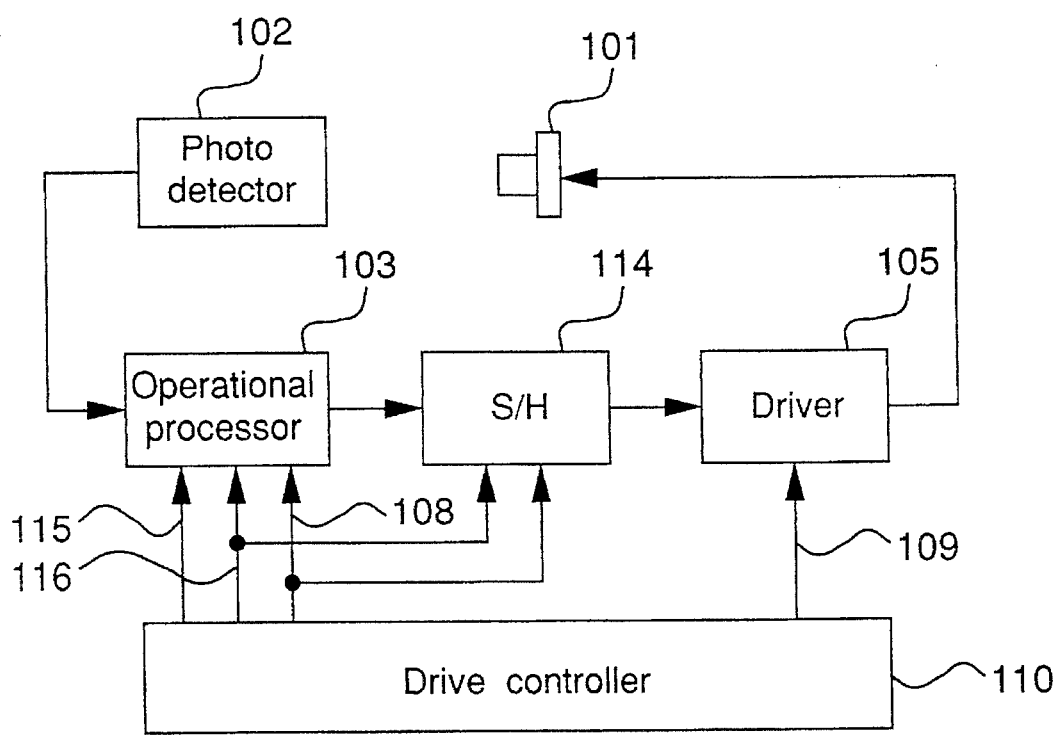
FIG. 2 is a block diagram of an example of a prior art laser power controller.
Figure 3:
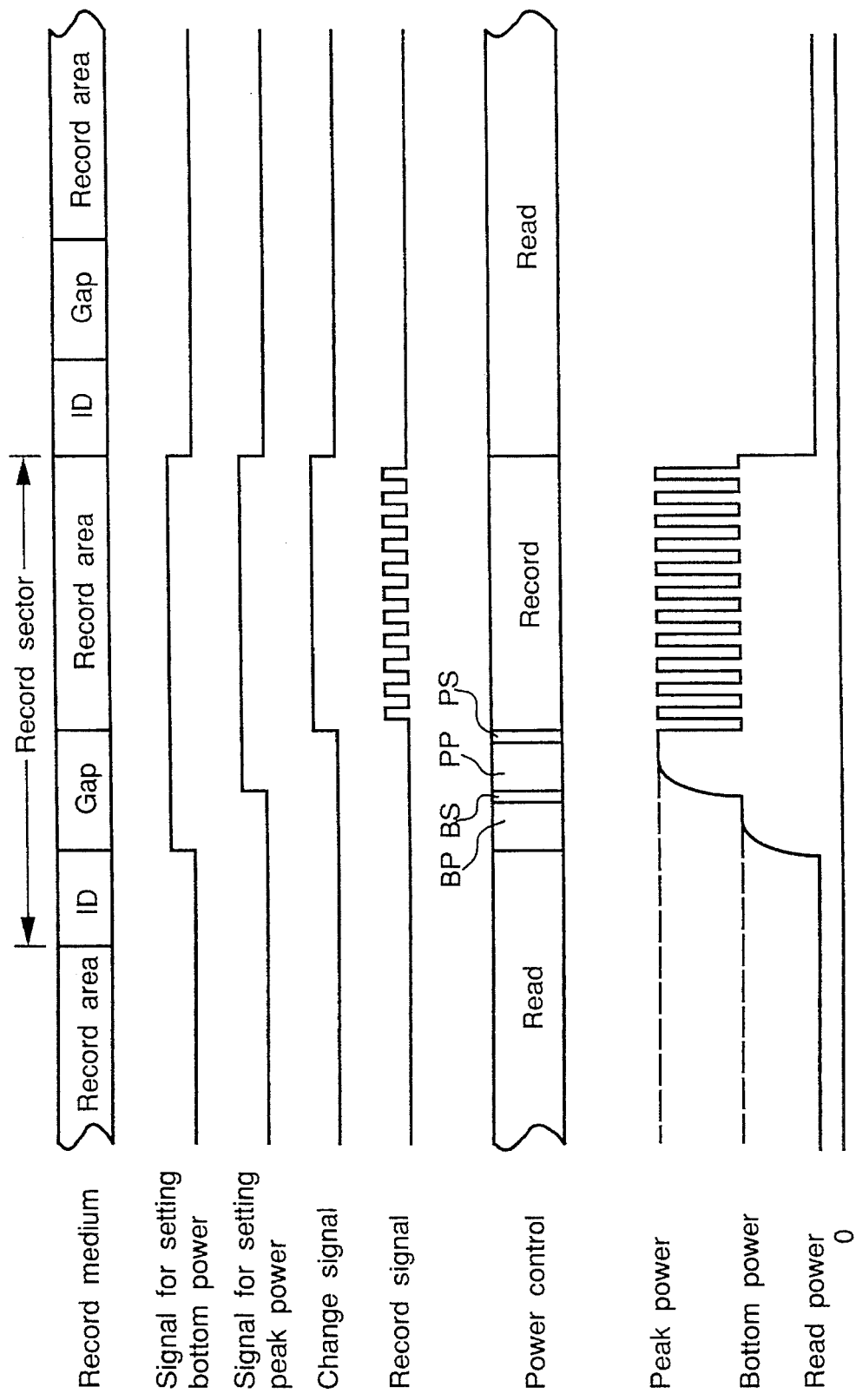
FIG. 3 is a diagram for setting laser power.

The bottom and peak powers can also be determined without emitting light actually in gap sections. A light-emitting-power vs. drive current characteristic as shown in FIGS. 1(a) and 1(b) can be determined by emitting light at two or more gap sections with two or more different drive currents. Then, the digital signal processor can set required bottom and peak powers according to the obtained characteristic.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A laser power controller for an apparatus of recording information in an optical record medium wherein a record track consists of record areas and gap sections not used to record information, each gap section being arranged before one of the record areas, which apparatus comprising:

a laser for emitting a beam onto an optical record medium;

a photodetector which detects an optical intensity of a part of the beam emitted by the laser and converts the optical intensity to an electrical signal;

an operational processor for determining a power to drive the laser to emit a beam according to the electrical signal received from the photodetector so that the optical intensity received from the photodetector when the laser is driven with the determined power agrees with a prescribed value;

a drive controller for sending a timing signal to said operational processor, which timing signal indicating that said operational processor can determine the power to drive said laser, wherein said drive controller sends the timing signal to said operational processor when the beam emitted by said laser enters a gap section on the optical record medium and said operational processor determines the power when the timing signal is received from said drive controller;

a memory means for storing the power determined by the operational processor whereby recording is performed with laser powers including a first power and a second power smaller than the first power, said drive controller sends the signal at two different gap sections, said operational processor determines the first and the second powers at the different gap sections and said memory means stores the determined first and second powers.

2. The apparatus according to claim 1, wherein said drive controller sends the timing signal to said operational processor in a gap section just before a record area located before a record area to be recorded so as to determine one of the first and second powers and in another gap section located just before the record area to be recorded so as to determine the other of the first and second powers.

3. The laser power controller according to claim 1, wherein if the laser power is not determined in only one gap section by said operational processor, said memory means stores an intermediate value obtained at the end of a gap section by said operational processor and said operational processor starts the determination again at a later gap section by reading the intermediate result from said memory means when the timing signal is received from said drive controller;

whereby said operational processor determines the power over a plurality of gap sections until the optical intensity received from said photodetector when said laser is driven with the determined power agrees with the prescribed value.

4. A method for controlling laser power of an apparatus for recording and reproducing information in an optical record medium with a laser beam, which optical record medium including a record track which consists of record areas and gap sections not used to record information, each gap section being arranged before one of the record areas, which method comprising the steps of:

(a) emitting a beam by a laser onto the optical record medium in a gap section located before a record area to be recorded;

(b) detecting the optical intensity of the beam;

(c) determining a power to drive the laser to emit a beam according to the detected optical intensity of the beam so that the optical intensity when the laser is driven with the determined power agrees with a prescribed value; and (d) storing the power in a memory means:
   wherein the above-mentioned sequence of (a)–(d) is repeated until the optical intensity received from the photodetector when the laser is driven with the power stored in the memory means agrees with a prescribed value;
   whereby the laser emits the beam in a record area to be recorded by using the power stored in the memory means; and
   wherein the recording is performed with a plurality of powers including a first power and a second power smaller than the first power, and the first and the second powers are determined at different gap sections and stored in said memory means.

5. The method according to claim 4, wherein the first and second powers are determined in a gap section located just before a record area preceding the record area to be recorded and in another gap section located just before the record area to be recorded.

6. A method for recording information in an optical record medium wherein a record track consists of record areas and gap sections not used to record information, each gap section being arranged before one of the record areas, by using a laser power controller, which laser power controller comprising: a laser for emitting a beam onto an optical record medium, a photodetector which detects an optical intensity of a part of the beam emitted by the laser and converts the optical intensity to an electrical signal, an operational processor for determining a power to drive the laser to emit a beam according to the electrical signal received from the photodetector, a memory means for storing the power determined by the operational processor; and a driver for driving the laser according to the power stored in the memory means, which method comprising the steps of:

(a) making the operational processor determine the power of the laser for recording information in the record area according to the output signal of the photodetector so that the optical intensity received from the photodetector when the laser is driven with the determined power agrees with a prescribed value, wherein the power used for recording includes a first power and a second power smaller than the first power, and the first and second powers are determined at different gap sections; and (b) storing the value of the power determined by the operational processor in the memory means;

whereby the power on recording information in the record area is set in a record area to be recorded by using the value of the power stored in the memory means.

7. The method according to claim 6, wherein the first and second powers are determined in a gap section located just before a record area preceding the record area to be recorded and in another gap section located just before the record area to be recorded, respectively.

8. The method according to claim 6, wherein when the recording is performed over a plurality of record areas, the first and second powers for the laser are determined initially in gap sections located before a first record area in the record areas and after the recording is started, the powers used for record areas after the first record area are determined by using gap sections located between record areas of the record areas.

9. The method according to claim 8, wherein after the recording is started, the first laser power and the second one are determined alternately.

10. The method according to claim 8, wherein after the recording is started, the first laser power and the second one are determined at a prescribed ratio of the setting times of the first laser power to the setting times of the second laser power.

11. The method according to claim 8, wherein after the recording is started, only the first laser power is determined.

12. The method according to claim 6, wherein if the laser power is not determined by using only one gap section, the intermediate result of the operation of the operational processor at the end of the gap section is stored in said memory means, and the determination is started again at a later gap section from the intermediate result stored in said memory means.

13. The method according to claim 6, wherein the determination of the power is performed in a plurality of gap sections, the determined powers are stored in said memory means and the power to emit the beam is set appropriately in a record area to be recorded according to the plurality of determined data stored in said memory means.

14. The method according to claim 13, wherein the power is set as an average of the determined data.

15. The method according to claim 13, wherein the power is set as the maximum of the determined data.

16. The method according to claim 13, wherein the power is set as the minimum of the determined data.

* * * * *